United States Patent Office 3,503,893
Patented Mar. 31, 1970

3,503,893
PROCESS FOR PRODUCING CHEMILUMI-NESCENCE BY REDUCTION OF METAL CHELATES
David M. Hercules, Arlington, and Fred E. Lytle, Cambridge, Mass., assignors to the United States of America as represented by the United States Atomic Energy Commission
No Drawing. Filed Jan. 13, 1967, Ser. No. 609,719
Int. Cl. C09k 1/02; C09c
U.S. Cl. 252—188.3
3 Claims

ABSTRACT OF THE DISCLOSURE

A chemiluminescence process useful as an emergency light source wherein light is produced as the result of the reaction between certain metal chelates and strong bases.

BACKGROUND OF THE INVENTION

Chemiluminescence may be defined as the production of light by chemical reaction. Generally luminescence can result if three criteria are met. First, sufficient energy must be available from the reaction sequence to produce an excited state of one of the participating molecules. Second, these excited moletcules must be capable either of emitting or transferring energy to a species that can emit. Third, the rate of the reaction must be sufficiently rapid so that photon production is detectable.

Chemiluminescence processes are useful as emergency light sources. They have an advantage in that the light source may readily be shaped to fit difficult configurations and are capable of storage for long periods without leakage of their energy.

Solution chemiluminescence to date has generally fell into three categories: reactions involving molecular oxygen or peroxides; oxidation of anion radicals; and alternating current electrolysis of aromatic hydrocarbons. It is an object of this invention to provide those skilled in the art with chemiluminescence processes wherein light is produced by an electron transfer to a potential emitter, i.e. via reduction reactions.

SUMMARY OF INVENTION

The invention described herein was made in the course of, or under a contract with the U.S. Atomic Energy Commission.

A chemiluminescence process comprising reacting a metal chelate selected from the group consisting of tris-(2,2'-bipyridyl) ruthenium (III); tris-(5-methyl-O-phenanthroline) ruthenium (III); tris-(5,6-dimethyl-O-phenanthroline) ruthenium (III) and tris-(3,5,6,8-tetramethyl-O-phenanthroline) ruthenium (III) with a strong base such as sodium hydroxide or potassium hydroxide to produce light. The reaction may be carried out with the metal chelate being dissolved in a neutral or acidic aqueous solution and utilizing an aqueous solution of the strong base.

The metal chelates found useable in our invention can readily be prepared by refluxing a mixture of ruthenium trichloride and the desired ligand e.g. 2,2' bipyridyl in a neutral solution of ethanol containing hydroxylamine hydrochloride. Procedures for producing such chelates are well known to those skilled in the art and are described in Brant, W. W. and Veening, H., Anal. Chem., 32, 1426 (1960).

In practice we have found it preferable to dissolve the metal chelate, so prepared, in a strongly acidic aqueous solution in order to oxidize it to the +3 valance state by contacting dissolved metal chelate with gaseous chlorine or solid lead dioxide and thereafter adding strongly basic aqueous solution to the oxidized metal chelate containing solution to produce the desired chemiluminescence. The acids and bases found useable in the practice of our invention can be of any inorganic or organic acids and bases.

The rate of reaction between the metal chelate and the basic material is proportional to the strength of the base used as a reactant, as well as to the degree of acidity of the aqueous solution in which the metal chelate is dissolved.

EXAMPLE 75 milligrams of Ru (II) (2,2'-bipyridyl)$_3$ were dissolved in 100 ml. of 2 N H$_2$SO$_4$. 5 grams of powdered lead dioxide were added to the solution and the solution was stirred until it turned green. The color change indicated oxidation of the chelate to the plus-three oxidation state. The particulate lead dioxide was then removed from the solution by centrifugation and decantation.

100 ml. of the decanted solution was mixed with 100 ml. of 2 N NaOH causing light to emanate from the mixture as the plus-three complex was reduced to the plus-two oxidation state.

The intensity of the light is directly proportional to the strength of the acid and base used. With 9 N H$_2$SO$_4$ and 9 N NaOH the tris-(2,2'bipyridyl) ruthenous dichloride complex, luminescence is visible to the non-dark-adapted eye, when carried out in dim light.

We claim:
1. A process for producing chemiluminescent light which comprises contacting a metal chelate selected from the group consisting of tris-(2,2'-bipyridyl) ruthenium (III), (5-methyl-O-phenanthroline) ruthenium (III), tris-(5,6-dimethyl-O-phenanthroline) ruthenium (III) and tris-(3,5,6,8-tetramethyl - O - phenanthroline) ruthenium (III) with an aqueous solution of a strong base selected from the group consisting of sodium hydroxide and potassium hydroxide.
2. A process in accordance with claim 1, wherein said metal chelate is tris-(2,2'-bipyridyl) ruthenium (III).
3. A process in accordance with claim 2, wherein said strong base is sodium hydroxide.

References Cited
IBM Tehnical Disclosure Bulletin, vol. 6, No. 7 (1963).

JOHN D. WELSH, Primary Examiner

U.S. Cl. X.R.
252—301.2, 408; 260—429